UNITED STATES PATENT OFFICE.

ROBERT R. WILLIAMS, OF ROSELLE, NEW JERSEY, ASSIGNOR TO WESTERN ELECTRIC COMPANY, INCORPORATED, OF NEW YORK, N. Y., A CORPORATION OF NEW YORK.

INSULATING COMPOSITION.

1,415,076.     Specification of Letters Patent.     Patented May 9, 1922.

No Drawing.     Application filed December 26, 1919. Serial No. 347,533.

*To all whom it may concern:*

Be it known that I, ROBERT R. WILLIAMS, a citizen of the United States, residing at Roselle, in the county of Union, State of New Jersey, have invented certain new and useful Improvements in Insulating Compositions, of which the following is a full, clear, concise, and exact description.

This invention relates to insulating compositions for electrical conductors and more particularly to those which are used in the construction of submarine telegraph, and other cables.

In selecting the material from which to construct an insulating sheet for the electrical conductors in a submarine cable, it is necessary to consider the effect which such material will have upon the rate at which the telegraphic signals may be transmitted. The speed of signaling varies inversely with the electrostatic capacity of the cable, which in turn varies directly with the specific inductive capacity of the dielectric which covers the conductor. The best result would be obtained should this specific inductive capacity be reduced to zero. This, however, is practically impossible of attainment. Gutta-percha and rubber compositions have in the past been used, since they, together with the other necessary properties, possess low specific inductive capacities. When rubber is employed, however, it is necessary that materials in the nature of fillers be added so that a structure capable of withstanding the mechanical stress encountered may be had. Many mixtures have been compounded with this particular point in view, but they have always possessed a materially higher specific inductive capacity than that possessed by the rubber alone. The object of this invention is to obtain a satisfactory material which when added to rubber will produce a medium which has a lower specific inductive capacity than that heretofore attained with other fillers.

It has been found that fused quartz is a suitable material for the purpose of this invention. The amount necessary to be added in any particular case will depend primarily upon the desired:

1. Specific inductive capacity,
2. Mechanical properties,
3. Economy of construction.

It will also depend on whether the composition as described above is to be the sole covering or whether an additional layer of insulating compound is to be used. In the latter case it is evident that the percentage of the fused quartz may be comparatively high and form the major part of the mixture. In such a case the rubber serves in reality as a binder and the fused quartz may be considered as the dielectric proper. The size of the fused quartz particles will also be determined largely by the nature and the number of the coatings to be applied. The fused quartz in a more or less finely ground condition may be compounded with the rubber in the usual manner with or without the addition of sulphur and fabricated into the desired form with or without subsequent vulcanization.

While quartz, mica, glass and like materials have been used in the past as fillers for rubber when the latter is employed as an insulating medium in submarine telegraph cables, it is to be noted that the structure as disclosed herein bears no relation to such prior usage. In every case the filler chosen has possessed a materially higher specific inductive capacity than that of the rubber used. This has been due probably to the fact that at the time when experiments were connected to secure a satisfactory filler for rubber, when used for such purposes, no material having the necessary mechanical and chemical properties and at the same time a low specific inductive capacity, was available. The following approximate figures will serve to show the relative specific inductive capacity values of the fillers heretofore employed, and that of rubber:

| Material. | Spec. ind. capacity. |
|---|---|
| Glass | 5–10 |
| Mica | 6 |
| Quartz | 5 |
| Rubber | 2.2 |

The addition of such fillers increases the specific inductive capacity of the mixture to a considerable extent over that of the rubber itself.

The development in recent years of the production of extremely high temperatures through the agency of the electric furnace has made it possible to fuse many substances which were previously considered to be infusible. Quartz in its natural crystalline form was presumed to be incapable of being converted into the amorphous or vitreous condition. This having been accomplished, however, a material possessing practically all of the mechanical properties of the original quartz, but having a much lesser specific inductive capacity has been attained. Thus the specific inductive capacity of fused quartz is approximately 3.5 to 3.7.

Therefore, while not sacrificing the advantage which has been recognized heretofore as being gained in increased firmness through the introduction of mineral substances, the use of the fused quartz will at the same time effect a lessening of the specific inductive capacity of the dielectric as a whole.

While rubber has been mentioned herein as the substance which is to be used as either the dielectric or binder, it is to be understood that any suitable material or mixture of such materials which might be used as an equivalent of rubber are intended to be included.

What is claimed is:

1. A composition of matter comprising fused quartz and rubber.

2. An insulating composition comprising rubber and silicia whose specific inductive capacity is not greater than 3.7.

3. An insulating composition comprising rubber and amorphous silica whose specific inductive capacity is not greater than 3.7.

4. An insulating composition comprising rubber and fused quartz whose specific inductive capacity is not greater than 3.7.

5. An insulating sheath for electrical conductors comprising rubber and silica whose specific inductive capacity is not greater than 3.7.

6. An insulating sheath for electrical conductors, comprising rubber and amorphous silica whose specific inductive capacity is not greater than 3.7.

7. An insulating sheath for electrical conductors comprising rubber and fused quartz whose specific inductive capacity is not greater than 3.7.

In witness whereof, I hereunto subscribe my name this 23rd day of December A. D., 1919.

ROBERT R. WILLIAMS.